United States Patent
Miyata (10) Patent No.: US 10,369,716 B2
(45) Date of Patent: Aug. 6, 2019

(54) LASER MACHINING APPARATUS INCLUDING GUIDE LASER

(71) Applicant: FANUC CORPORATION, Yamanashi (JP)

(72) Inventor: Ryusuke Miyata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 43 days.

(21) Appl. No.: 15/730,093

(22) Filed: Oct. 11, 2017

(65) Prior Publication Data

US 2018/0104838 A1 Apr. 19, 2018

(30) Foreign Application Priority Data

Oct. 14, 2016 (JP) .................................. 2016-202834

(51) Int. Cl.
*B26D 5/00* (2006.01)
*B23K 26/04* (2014.01)
(Continued)

(52) U.S. Cl.
CPC ............ *B26D 5/007* (2013.01); *B23K 26/043* (2013.01); *B23K 26/048* (2013.01); *B23K 26/38* (2013.01); *B23K 26/60* (2015.10)

(58) Field of Classification Search
CPC .... B23K 26/043; B23K 26/048; B23K 26/38; B23K 26/60; B26D 5/007; G05B 19/402
(Continued)

(56) References Cited

U.S. PATENT DOCUMENTS

| 4,659,900 A * | 4/1987 | Gilli ..................... B23K 26/10 219/121.67 |
| 2008/0222905 A1* | 9/2008 | Nishimura ........... G01C 15/004 33/286 |

(Continued)

FOREIGN PATENT DOCUMENTS

| DE | 102006030130 B3 * | 9/2007 | ............ B25J 19/021 |
| JP | H05-183215 A | 7/1993 | |

(Continued)

*Primary Examiner* — Chun Cao
(74) *Attorney, Agent, or Firm* — Studebaker & Brackett PC (57) ABSTRACT

A laser machining apparatus capable of extending the life time of a guide laser is provided. A laser machining apparatus 1 includes a cutting head 2 that irradiates a machining laser light to a machining target W, a guide laser 5 that irradiates a visible guide light to the machining target W, and a power supply 6 that supplies electric power to the guide laser 5. The laser machining apparatus 1 further includes a controller 7 that performs control so that, before the machining laser light is irradiated from the cutting head 2 to the machining target W and laser cutting starts, electric power is supplied from the power supply 6 to the guide laser 5, and the guide light is irradiated from the guide laser 5 to the machining target W according to an output position of the machining laser light output from the cutting head 2 so that the output position of the machining laser light is ascertained. The controller 7 has a laser output setting unit 4 capable of adjusting an output of the guide light of the guide laser 5 within a range where the visibility of the guide light is secured when the guide light is output from the guide laser 5.

6 Claims, 5 Drawing Sheets

(51) Int. Cl.
 *B23K 26/38* (2014.01)
 *B23K 26/60* (2014.01)
(58) Field of Classification Search
 USPC ............................................. 700/166
 See application file for complete search history.

(56) References Cited

U.S. PATENT DOCUMENTS

| | | | | |
|---|---|---|---|---|
| 2013/0220983 A1* | 8/2013 | Haschke | ............... | B23K 26/03 |
| | | | | 219/121.81 |
| 2014/0025191 A1* | 1/2014 | Wadehn | ............... | B23K 26/048 |
| | | | | 700/166 |
| 2017/0021449 A1* | 1/2017 | Sakamoto | .............. | B23K 26/04 |
| 2018/0264591 A1* | 9/2018 | Agrawal | ............. | B23K 26/048 |

FOREIGN PATENT DOCUMENTS

| | | |
|---|---|---|
| JP | 2009-285721 A | 12/2009 |
| JP | 2016-068110 A | 5/2016 |

* cited by examiner

LASER MACHINING APPARATUS INCLUDING GUIDE LASER

This application is based on and claims the benefit of priority from Japanese Patent Application No. 2016-202834, filed on 14 Oct. 2016, the content of which is incorporated herein by reference.

BACKGROUND OF THE INVENTION

Field of the Invention

The present invention relates to a laser machining apparatus.

Related Art

Conventionally, a laser machining apparatus which includes a guide laser having a function of irradiating a visible guide light to a machining target in order to check an output position of a machining laser light before starting laser cutting on the machining target is known (for example, see Patent Documents 1 and 2).

In such a guide laser, a guide light is output with a predetermined output to secure visibility of the guide light so that the inherent function is exhibited.

Patent Document 3 discloses an optical fiber guide light generation apparatus which includes a visible light laser diode that oscillates a visible laser light, a driving circuit that drives the visible light laser diode, and a pulse generation circuit for oscillating visible light laser pulses in this driving circuit in order to reduce the size thereof.

Patent Document 1: Japanese Unexamined Patent Application, Publication No. 2009-285721.
Patent Document 2: Japanese Unexamined Patent Application, Publication No. 2016-68110.
Patent Document 3: Japanese Unexamined Patent Application, Publication No. H05-183215.

SUMMARY OF THE INVENTION

However, in such a guide laser, if a guide light is output with a high output exceeding an output in which the visibility of a guide light is secured, the life time of the guide laser decreases inevitably. In general, it is not easy to replace a guide laser, and it is very important to extend the life time of the guide laser since it is preferable to extend the replacement interval.

Patent Document 1 merely discloses a technique which includes a power adjustment means configured to be able to adjust light intensity of a guide light with an aim to improve the visibility of a guide light, but an object of the invention is not to extend the life time of the guide laser.

Moreover, Patent Document 2 discloses a technique of setting the light intensity of a visible light laser to be small as the ambient temperature of a visible light laser light source increases in order to suppress a reduction in the life time of the visible light laser light source, but does not take the visibility of a guide light into consideration.

Furthermore, an object of the invention disclosed in Patent Document 3 is not to extend the life time of a guide laser as described above.

The present invention has been made in view of such a problem, and an object thereof is to provide a laser machining apparatus capable of extending the life time of a guide laser.

(1) A laser machining apparatus (for example, a laser machining apparatus 1, 11, or 21 to be described later) according to the present invention includes: a cutting head (for example, a cutting head 2 to be described later) that irradiates a machining laser light to a machining target; a guide laser (for example, a guide laser 5 to be described later) that irradiates a visible guide light to the machining target; a power supply (for example, a power supply 6 to be described later) that supplies electric power to the guide laser; and a controller (for example, a controller 7 to be described later) that performs control so that, before the machining laser light is irradiated from the cutting head to the machining target and laser cutting starts, electric power is supplied from the power supply to the guide laser, and the guide light is irradiated from the guide laser to the machining target according to an output position of the machining laser light output from the cutting head so that the output position of the machining laser light is ascertained, wherein the controller has a laser output setting unit (for example, a laser output setting unit 4, 14, or 24 to be described later) capable of adjusting an output of the guide light of the guide laser within a range where the visibility of the guide light is secured when the guide light is output from the guide laser.

(2) In the laser machining apparatus according to (1), the laser machining apparatus includes a gap sensor (for example, a gap sensor 3 to be described later) that measures a distance between the cutting head and the machining target, and the laser output setting unit adjusts an output of the guide light of the guide laser according to the distance based on an output signal from the gap sensor.

(3) In the laser machining apparatus according to (2), the laser output setting unit correlates the output of the guide light of the guide laser with the distance using a quadratic function when adjusting the output of the guide light of the guide laser.

(4) In the laser machining apparatus according to any one of (1) to (3), the laser machining apparatus includes a scattered light sensor (for example, a photodiode 8 to be described later) that detects an intensity of a scattered light of the guide light irradiated from the guide laser to the machining target, and the laser output setting unit adjusts the output of the guide light of the guide laser according to the intensity of the scattered light on the basis of an output signal of the scattered light sensor.

(5) In the laser machining apparatus according to any one of (1) to (4), the laser machining apparatus includes an illuminance sensor (for example, a photodiode 9 to be described later) that detects an illuminance of an environment where the machining target is provided, and the laser output setting unit adjusts the output of the guide light of the guide laser according to the illuminance of the environment on the basis of an output signal from the illuminance sensor.

(6) In the laser machining apparatus according to (5), the laser output setting unit correlates the output of the guide light of the guide laser with the illuminance of the environment using a linear function when adjusting the output of the guide light of the guide laser.

According to the present invention, when a guide light is output from a guide laser of a laser machining apparatus, it is possible to adjust the output of a guide light of a guide laser within a range where the visibility of the guide light is secured. As a result, it is possible to prevent unnecessary output of a guide light of the guide laser to extend the life time of the guide laser.

DETAILED DESCRIPTION OF THE INVENTION

Hereinafter, a first embodiment of the present invention will be described with reference to the drawings. In the description of the second and subsequent embodiments, the same components as those of the first embodiment will be denoted by the same reference numerals, and the description thereof will be omitted.

First Embodiment

Figure 1:
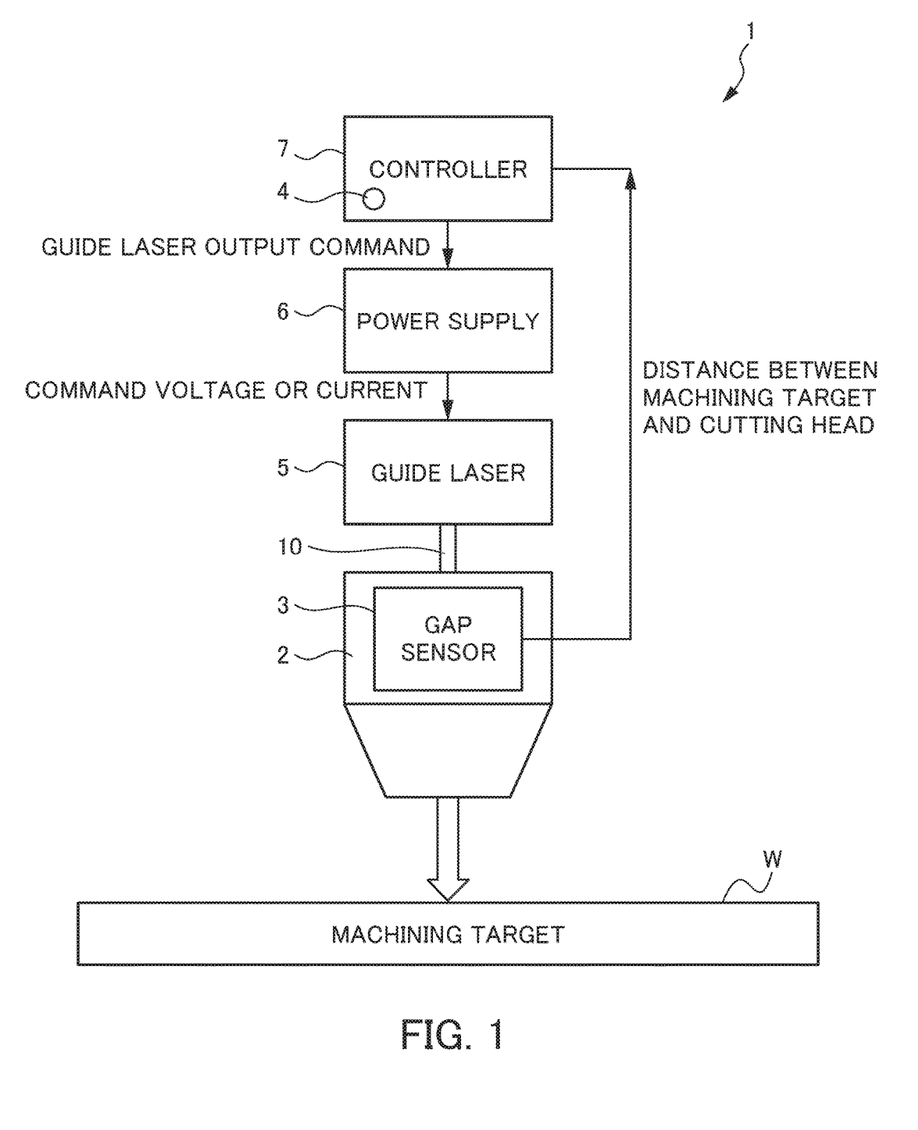
FIG. 1 is a diagram illustrating a configuration of a laser machining apparatus according to a first embodiment.
Figure 2:
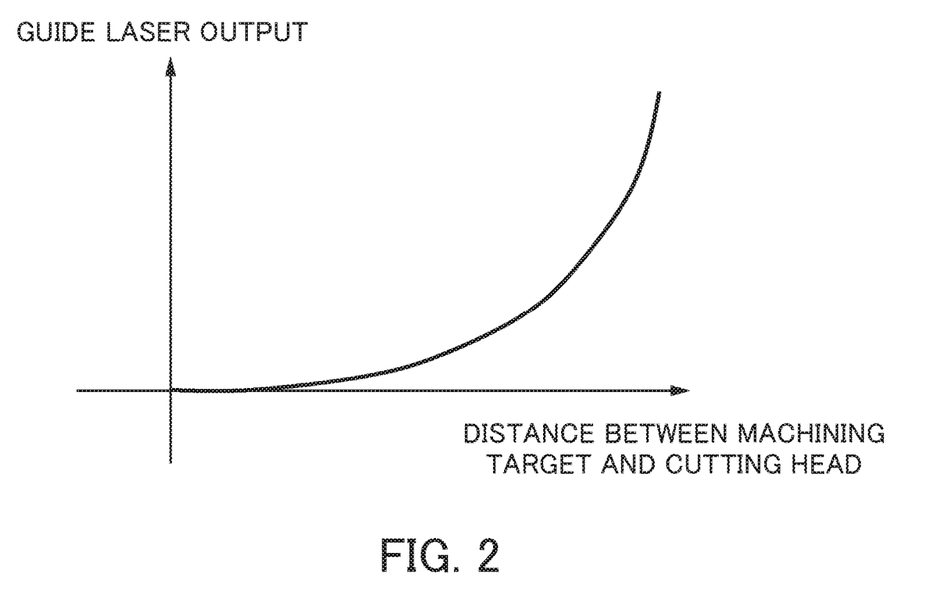
FIG. 2 is a graph illustrating a relation between the distance between a cutting head and a machining target and a guide laser output according to the first embodiment.

FIG. 1 is a diagram illustrating a configuration of a laser machining apparatus according to a first embodiment of the present invention. FIG. 2 is a graph illustrating a relation between the distance between a cutting head and a machining target and a guide laser output according to the first embodiment of the present invention.

As illustrated in FIG. 1, a laser machining apparatus 1 according to the first embodiment includes a cutting head 2, a guide laser 5, a power supply 6, a controller 7, and an optical fiber 10. Further, a gap sensor 3 is attached to the cutting head 2, and the controller 7 includes a laser output setting unit 4.

The cutting head 2 irradiates a machining laser light to a machining target W on the basis of a command from the controller 7.

The guide laser 5 receives electric power from the power supply 6 and irradiates a visible guide light to the machining target W via an optical fiber 10.

The power supply 6 supplies predetermined electric power (voltage or current) to the guide laser 5 on the basis of an output command.

The controller 7 allows electric power to be supplied from the power supply 6 to the guide laser 5 before a machining laser light is irradiated from the cutting head 2 to the machining target W and laser cutting starts and allows a guide light to be irradiated from the guide laser 5 to the machining target W according to an output position of the machining laser light output from the cutting head 2 so that an operator can ascertain the output position of the machining laser light.

The gap sensor 3 measures the distance between the cutting head 2 and the machining target W on the basis of a command from the controller 7.

When a guide light is output from the guide laser 5, the laser output setting unit 4 adjusts the output of the guide light within a range where the visibility of the guide light is secured. For example, the output of the guide light is set to a minimum level.

Specifically, the laser output setting unit 4 adjusts the output of the guide light of the guide laser 5 according to the distance on the basis of an output signal from the gap sensor 3 (that is, according to the distance between the cutting head 2 and the machining target W). An example of an output adjustment method is based on the fact that a guide light of the guide laser 5 attenuates in an inverse proportion to a square of an arrival distance thereof. As illustrated in FIG. 2, the output of the guide light of the guide laser 5 may be correlated with the distance between the cutting head 2 and the machining target W using a quadratic function.

As described above, in the laser machining apparatus 1 according to the present embodiment, when the guide light is output from the guide laser 5, the output of the guide light of the guide laser 5 is adjusted on the basis of the distance between the cutting head 2 and the machining target W measured by the gap sensor 3. Therefore, the output of the guide light can be adjusted within a range where the visibility of the guide light is secured. As a result, it is possible to prevent unnecessary output of the guide light of the guide laser 5 and to extend the life time of the guide laser 5.

Second Embodiment

Figure 3:
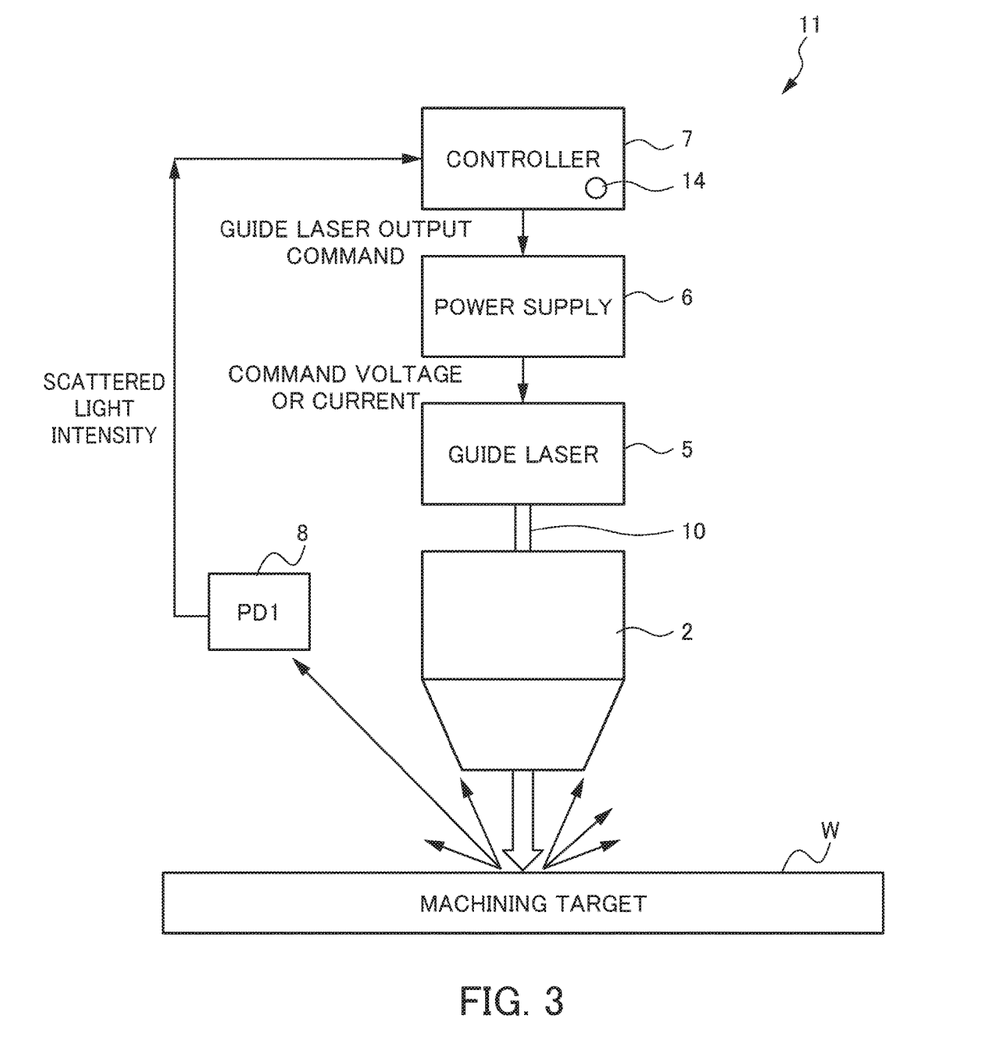
FIG. 3 is a diagram illustrating a configuration of a laser machining apparatus according to a second embodiment.

FIG. 3 is a diagram illustrating a configuration of a laser machining apparatus according to a second embodiment of the present invention.

A laser machining apparatus 11 according to the second embodiment is configured such that, when a guide light is output from the guide laser 5, the output of the guide light of the guide laser 5 is adjusted according to the intensity of a scattered light of the guide light irradiated to the machining target W instead of adjusting the output of the guide light of the guide laser 5 according to the distance between the cutting head 2 and the machining target W. Since the other components are basically similar to those of the first embodiment, the same members will be denoted by the same reference numerals, and the description thereof will be omitted.

That is, as illustrated in FIG. 3, in the laser machining apparatus 11, a photodiode 8 as a scattered light sensor is provided near the cutting head 2. The photodiode 8 detects the intensity of a scattered light of the guide light irradiated from the guide laser 5 to the machining target W. Moreover, the laser output setting unit 14 of the controller 7 adjusts the output of the guide light of the guide laser 5 according to the intensity of the scattered light on the basis of an output signal from the photodiode 8 (that is, according to the intensity of the scattered light of the guide light irradiated from the guide laser 5 to the machining target W).

Specifically, the laser output setting unit 14 performs feedback control on an output command for electric power to be supplied from the power supply 6 to the guide laser 5 so that the intensity of the scattered light of the guide light reaches a predetermined value. For example, a constant coefficient is multiplied with a subtraction of the intensity of scattered light from a predetermined value, the multiplication result is added to a previous output command, and the addition result is used as a present output command.

As described above, in the laser machining apparatus 11 according to the present embodiment, when the guide light is output from the guide laser 5, the output of the guide light of the guide laser 5 is adjusted on the basis of the intensity of the scattered light of the guide light irradiated from the guide laser 5 to the machining target W. Therefore, it is possible to adjust the output of the guide light within a range where the visibility of the guide light is secured. As a result, similarly to the first embodiment, it is possible to prevent unnecessary output of the guide light of the guide laser 5 and to extend the life time of the guide laser 5.

Third Embodiment

Figure 4:
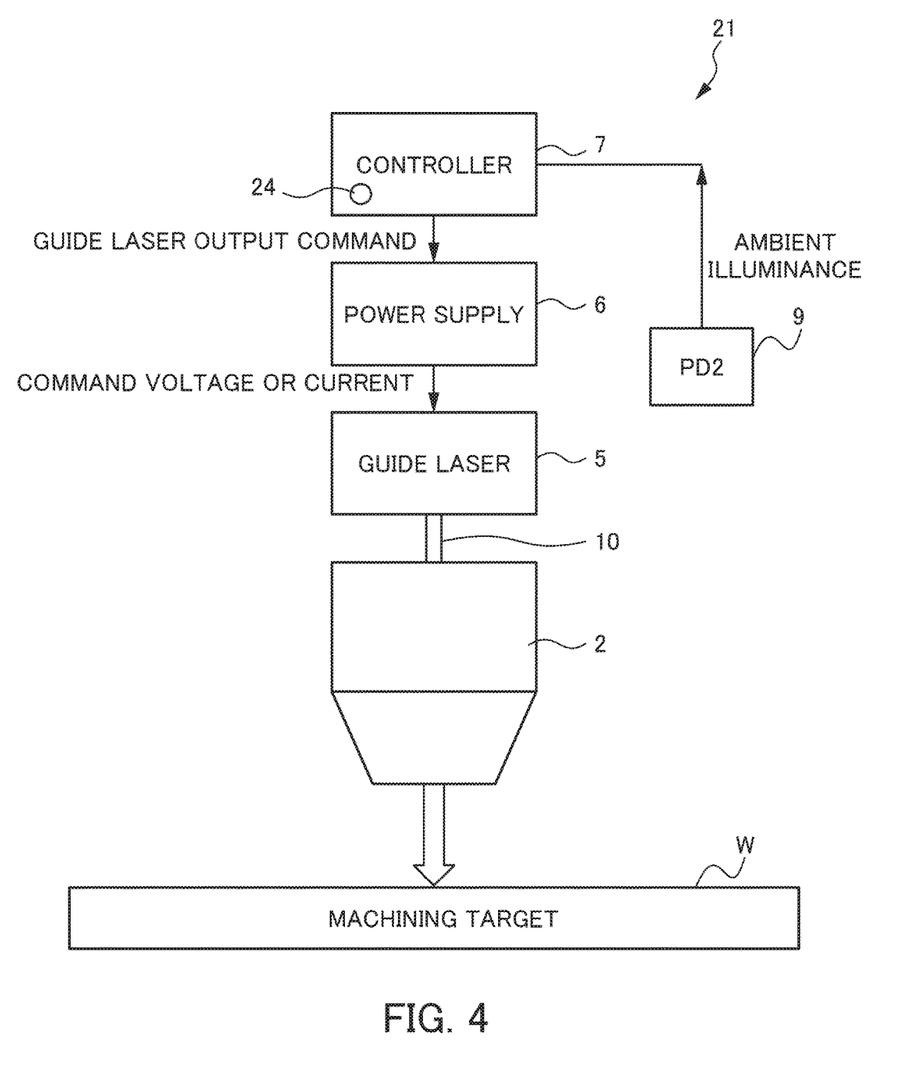
FIG. 4 is a diagram illustrating a configuration of a laser machining apparatus according to a third embodiment.
Figure 5:
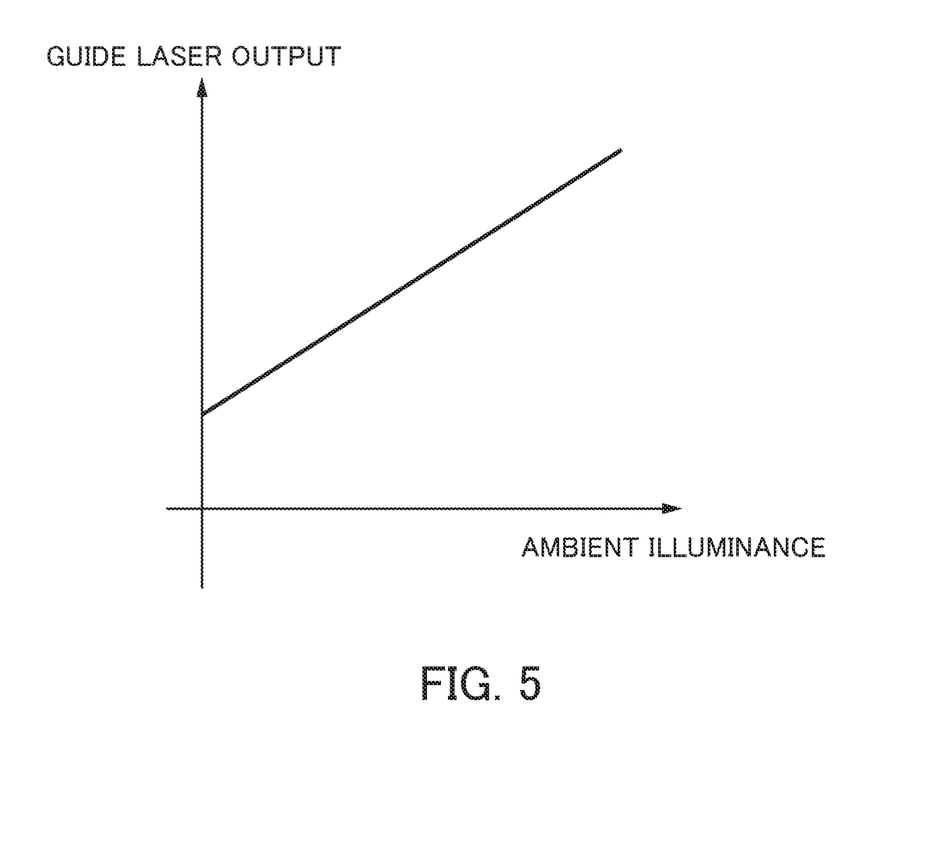
FIG. 5 is a graph illustrating a relation between an ambient illuminance of an environment and a guide laser output according to a third embodiment.

FIG. 4 is a diagram illustrating a configuration of a laser machining apparatus according to a third embodiment of the present invention. FIG. 5 is a graph illustrating a relation between an ambient illuminance of an environment and a guide laser output according to a third embodiment.

A laser machining apparatus 21 according to the third embodiment is configured such that when a guide light is output from the guide laser 5, the output of the guide light of the guide laser 5 is adjusted according to an illuminance of an environment where the machining target W is provided instead of adjusting the output of the guide light of the guide laser 5 according to the distance between the cutting head 2 and the machining target W. Since the other components are basically similar to those of the first embodiment, the same members will be denoted by the same reference numerals, and the description thereof will be omitted.

That is, in the laser machining apparatus 21, as illustrated in FIG. 4, a photodiode 9 as an illuminance sensor is provided near the cutting head 2. The photodiode 9 detects illuminance of an environment where the machining target W is provided. Moreover, the laser output setting unit 24 of the controller 7 adjusts the output of the guide light of the guide laser 5 according to the illuminance on the basis of an output signal from the photodiode 9 (that is, the illuminance of the environment where the machining target W is provided). As an example of the output adjustment method, as illustrated in FIG. 5, the output of the guide light of the guide laser 5 may be correlated with the illuminance of the environment where the machining target W is provided using a linear function (for example, a proportional relation).

As described above, in the laser machining apparatus 21 according to the present embodiment, when the guide light is output from the guide laser 5, the output of the guide light of the guide laser 5 is adjusted on the basis of the illuminance of the environment where the machining target W is provided. Therefore, it is possible to adjust the output of the guide light within a range where the visibility of the guide light is secured. As a result, similarly to the first and second embodiments, it is possible to prevent unnecessary output of the guide light of the guide laser 5 and to extend the life time of the guide laser 5.

The present invention is not limited to the first to third embodiments, and modifications and improvements within a range where the object of the present invention can be achieved fall within the present invention.

In the first embodiment, the laser machining apparatus 1 in which the gap sensor 3 is attached to the cutting head 2 has been described. However, the gap sensor 3 may not necessarily be attached to the cutting head 2 as long as it is possible to measure the distance between the cutting head 2 and the machining target W.

In the first embodiment, a case in which a quadratic function is used when adjusting the output of the guide light of the guide laser 5 according to the distance between the cutting head 2 and the machining target W has been described. However, it is not always necessary to use the quadratic function.

Furthermore, in the third embodiment, a case in which a linear function is used when adjusting the output of the guide light of the guide laser 5 according to the illuminance of the environment where the machining target W is provided has been described. However, it is not always necessary to use the linear function.

In the first to third embodiments, cases in which, when setting the output of the guide light of the guide laser 5, the output of the guide light of the guide laser 5 is adjusted according to an independent sensing output (the distance between the cutting head 2 and the machining target W, the intensity of the scattered light of the guide light of the guide laser 5, and the illuminance of the environment where the machining target W is provided) have been described. However, the output of the guide light of the guide laser 5 may be adjusted according to the other sensing output as long as it is possible to adjust the output of the guide light within a range where the visibility of the guide light is secured when guide light is output from the guide laser 5.

EXPLANATION OF REFERENCE NUMERALS 1, 11, 21: Laser machining apparatus
2: Cutting head
3: Gap sensor
4, 14, 24: Laser output setting unit
5: Guide laser
6: Power supply
7: Controller
8: Photodiode (Scattered light sensor)
9: Photodiode (Illuminance sensor)
W: Machining target

What is claimed is:

1. A laser machining apparatus comprising:
a cutting head that irradiates a machining laser light to a machining target;
a guide laser that irradiates a visible guide light to the machining target;
a power supply that supplies electric power to the guide laser; and
a controller that performs control so that, before the machining laser light is irradiated from the cutting head to the machining target and laser cutting starts, electric power is supplied from the power supply to the guide laser, and the guide light is irradiated from the guide laser to the machining target according to an output position of the machining laser light output from the cutting head so that the output position of the machining laser light is ascertained, wherein
the controller has a laser output setting unit capable of adjusting an output of the guide light of the guide laser within a range where the visibility of the guide light is secured when the guide light is output from the guide laser, and
a gap sensor that measures a distance between the cutting head and the machining target, wherein
the laser output setting unit adjusts an output of the guide light of the guide laser according to the distance based on an output signal from the gap sensor.

2. The laser machining apparatus according to claim 1, wherein
the laser output setting unit correlates the output of the guide light of the guide laser with the distance using a quadratic function when adjusting the output of the guide light of the guide laser.

3. The laser machining apparatus according to claim 1, wherein
the laser machining apparatus includes a scattered light sensor that detects an intensity of a scattered light of the guide light irradiated from the guide laser to the machining target, and
the laser output setting unit adjusts the output of the guide light of the guide laser according to the intensity of the scattered light on the basis of an output signal of the scattered light sensor.

4. The laser machining apparatus according to claim 1, wherein the laser machining apparatus includes an illuminance sensor that detects an illuminance of an environment where the machining target is provided, and the laser output setting unit adjusts the output of the guide light of the guide laser according to the illuminance of the environment on the basis of an output signal from the illuminance sensor.

5. The laser machining apparatus according to claim 4, wherein the laser output setting unit correlates the output of the guide light of the guide laser with the illuminance of the environment using a linear function when adjusting the output of the guide light of the guide laser.

6. The laser machining apparatus according to claim 1, wherein a predetermined amount of electric power is supplied from the power supply to the guide laser, the controller adjusts the output of the guide light of the guide laser by supplying an amount of electric power that is different from the predetermined amount, and the laser output setting unit adjusts the output of the guide light of the guide laser by supplying the amount of electric power that is different from the predetermined amount.

* * * * *